March 23, 1937. G. SOUZA ET AL 2,074,521
CULTIVATOR
Filed April 28, 1936 4 Sheets-Sheet 1

INVENTOR
George Edward Souza
BY
Harry Schroeder
ATTORNEY

March 23, 1937.  G. SOUZA ET AL  2,074,521
CULTIVATOR
Filed April 28, 1936    4 Sheets-Sheet 2
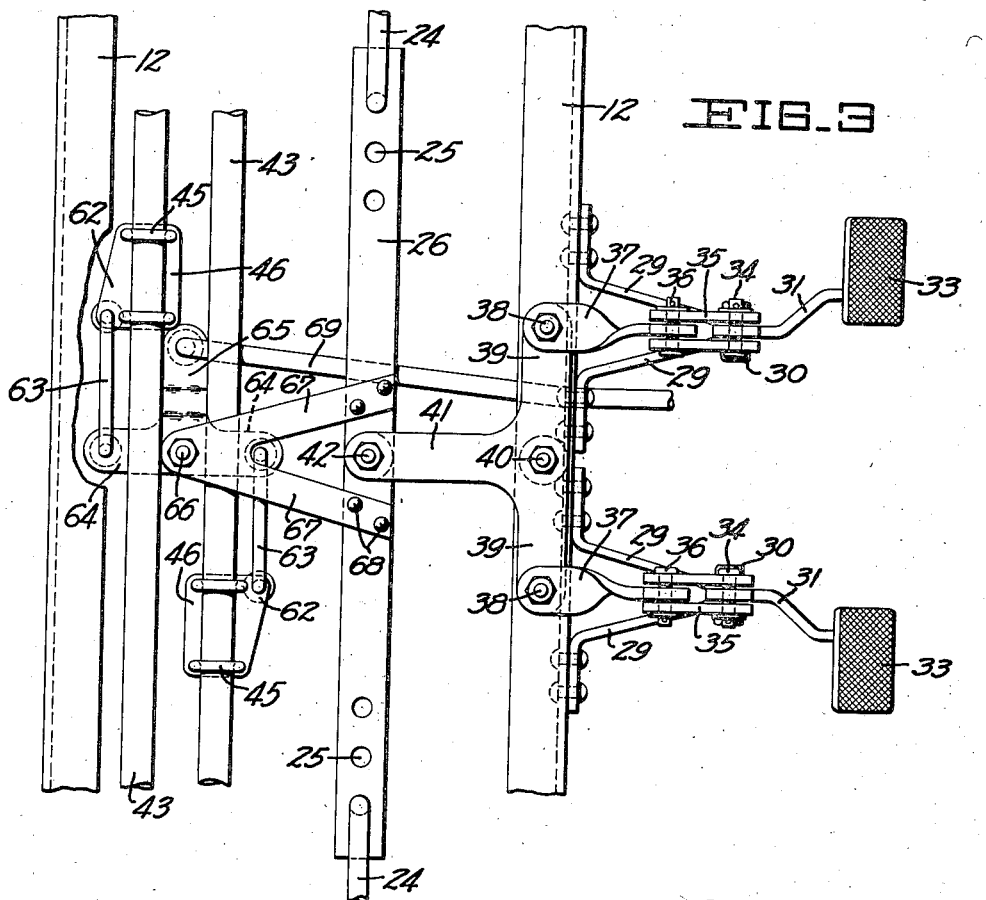
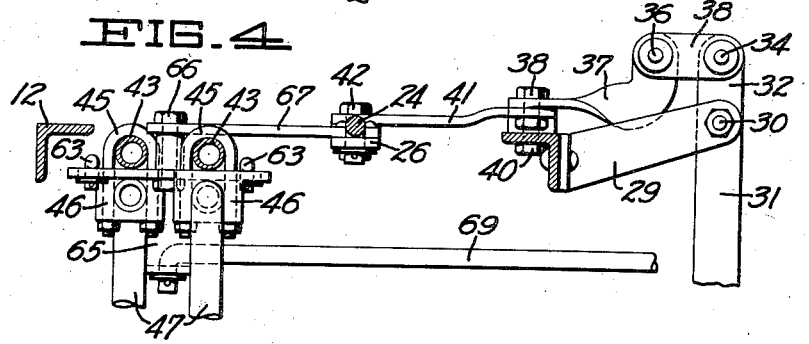
INVENTOR
George Souza
Edward Souza
BY
Harry Schroeder
ATTORNEY

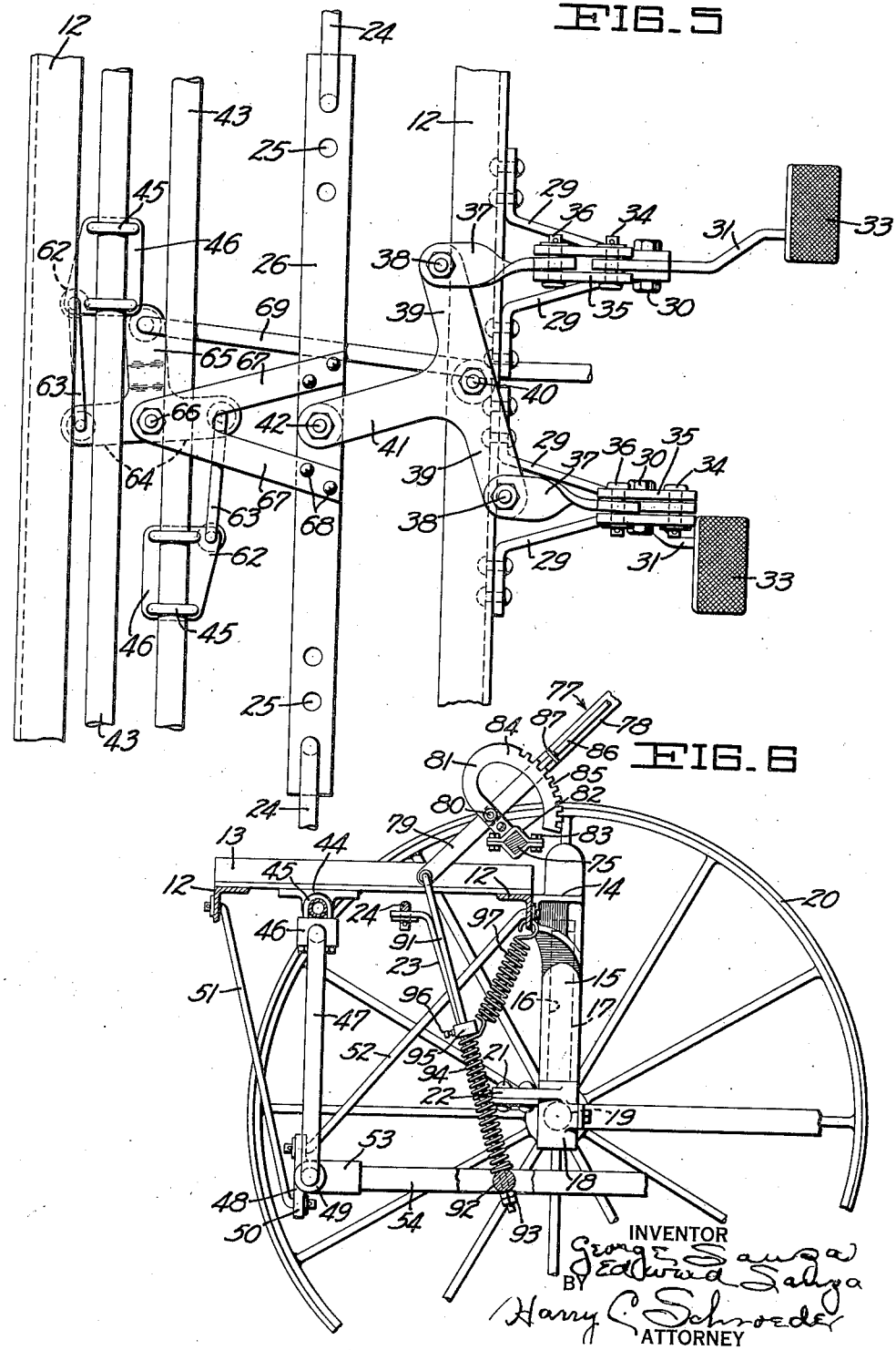

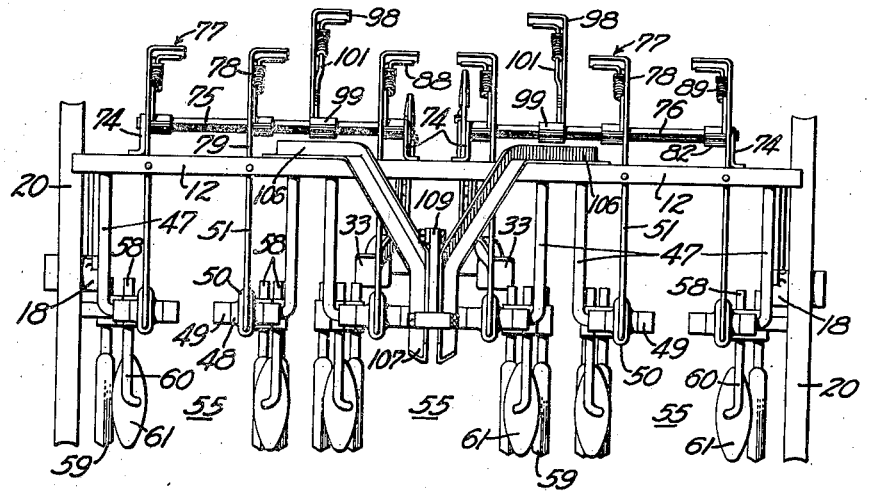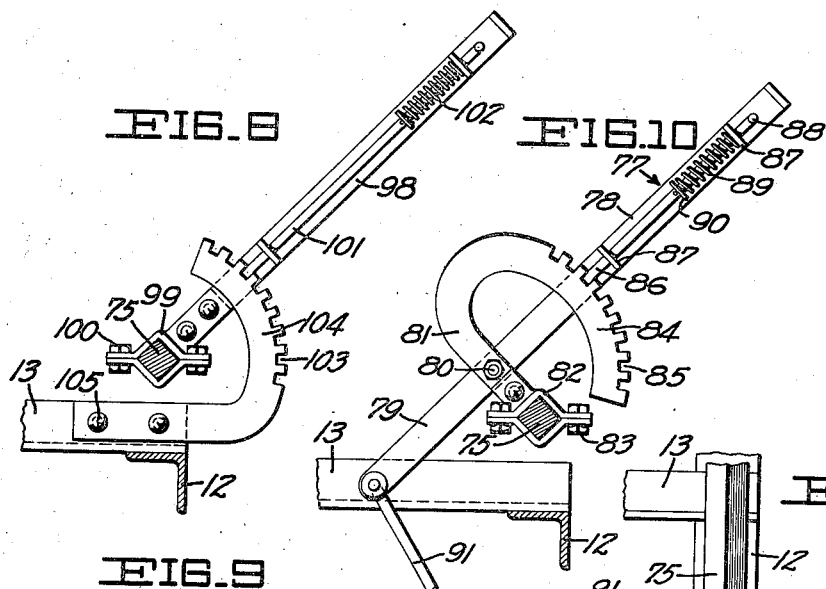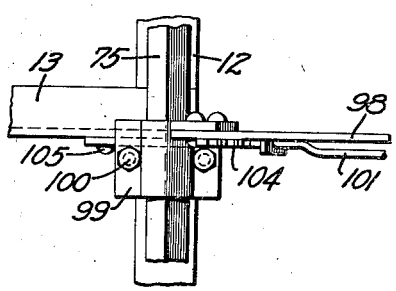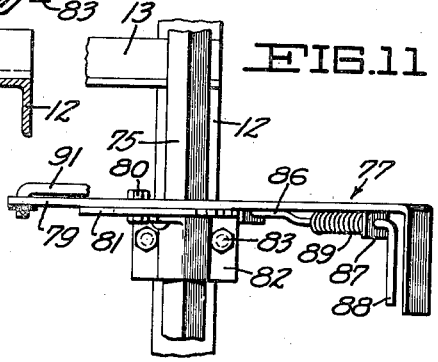

Patented Mar. 23, 1937

2,074,521

UNITED STATES PATENT OFFICE 2,074,521

CULTIVATOR

George Souza and Edward Souza, Irvington, Calif.

Application April 28, 1936, Serial No. 76,744

4 Claims. (Cl. 97—155)

This invention relates to mechanisms for the tillage of soil.

It is an object of the invention to provide a tilling implement which will, at one pass, cultivate the soil on each side of three rows of crops.

Other objects of the invention are: to provide a cultivator which may be steered to the right or left, while moving in a forward direction, so as to enable the operator to maintain the implement in alinement with the rows of crops; to provide for lateral adjustment between the respective groups of plows so that the width of the course of soil cultivated may be varied while the cultivator is in motion; to provide for shifting of the several gangs of plows simultaneously with movement of the wheels to steer the cultivator; to provide for vertical adjustment of the plows either separately or as groups while the cultivator is in motion; to provide for instantly varying the depth of cut of all the plows as a unitary group; and to provide means associated with each gang of plows for breaking up and moving away from the plants the topsoil crust so that the possibility of clods of crust being thrown on and injuring the plants, is obviated.

The invention possesses other objects and features of advantage, some of which, together with the foregoing, will be specifically set forth in the detailed description of the invention which follows. It is to be understood that the invention is not to be limited to the particular form thereof herein shown and described, as various embodiments thereof may be employed within the scope of the appended claims.

Referring to the drawings:

Figure 3 is a top plan view of a portion of the cultivator showing the steering mechanism and the connection between this mechanism and the shifting mechanism for the plow gangs.

Figure 4 is a vertical elevational view of the structure shown in Figure 3.

Figure 5 is a top plan view of the mechanism illustrated in Figure 3 showing the positions of the various elements of the mechanism while the cultivator is being steered to the left.

Figure 6 is a vertical sectional view of the cultivator. The plane in which the view is taken is indicated by the line 6—6 of Figure 1.

Figure 7 is a front elevational view of the cultivator.

Figure 8 is a fragmental vertical sectional view of the cultivator showing one of the master levers for operating a group of plow gangs.

Figure 9 is a top plan view of the mechanism shown in Figure 8.

Figure 10 is a fragmental vertical sectional view of the cultivator showing one of the operating levers for raising or lowering the individual plow gangs.

Figure 11 is a top plan view of the mechanism shown in Figure 10.

Figure 2:
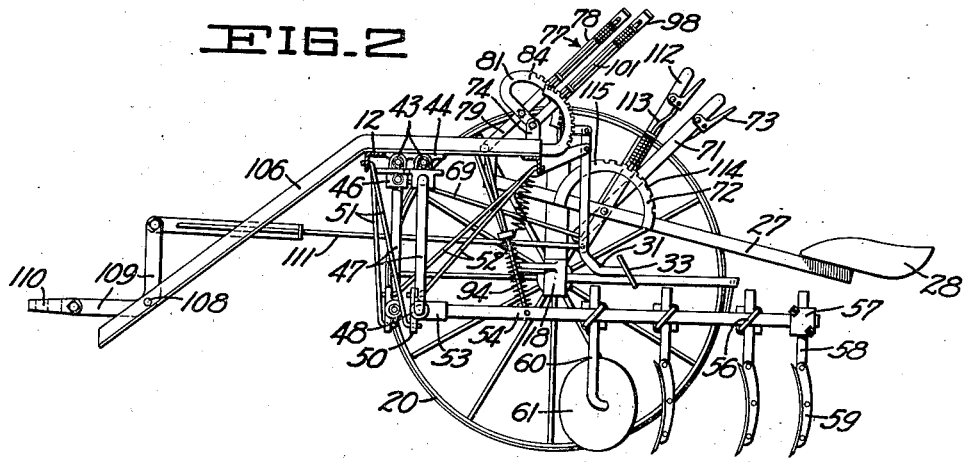
Figure 2 is a vertical sectional view of the cultivator. The plane in which the view is taken is indicated by the line 2—2 of Figure 1.

In detail, the cultivator comprises a main frame composed of a pair of spaced parallel angle bars 12 secured together by angle iron cross members 13 which are spaced along the length of the bars 12. Mounted at each end of one of the bars 12 are brackets 14 each having a vertically disposed cylindrical portion 15 provided with a bore 16 which journals a spindle 17 carrying at its lower end a block 18 from which there projects a transverse spindle 19 upon which the cultivator wheel 20 is journaled. Attached, by rivets 21, to an arm 22 formed on each block 18 is a lever 23 extending upwardly toward the main frame and provided at its upper end with an aperture which provides a journal for the outer end of a tie rod 24, the inner ends of the latter being pivotally secured in apertures 25 provided in a tie bar 26 which joins the tie rods together. It will be seen that, since each wheel 20 is mounted to pivot about the axis of its spindle 17, and the two wheels are connected together by the tie rods and bar 24 and 26 respectively, movement of the bar and rods axially will cause both wheels to move to angular positions with respect to the transverse axis of the cultivator, whereupon, when the cultivator is moving in a forward direction it may be steered to the right or left.

Secured at one end thereof to the main frame bars 12 is a pair of beams 27 which project rearwardly of the main frame and support, at their outer ends, a bucket seat 28 for the operator.

Means are provided adjacent the seat 28, and controllable by the operator, for actuating the tie bar and rods 26 and 24 respectively to steer the cultivator. Secured in spaced relation on the vertical face of one of the frame bars 12, as is shown in Figures 3, 4 and 5, is a plurality of pairs of brackets 29, the outer end of each bracket being apertured to receive a bolt 30 on which is pivoted a lever 31 provided with an arm 32 extending upwardly beyond the pivot. The lower end of each lever 31 is bent outwardly and provided with a pad 33 which is positioned to be within reach of the operator's foot. The distal end of each extension 32 is apertured to receive a pin 34 which pivotally supports one end of a pair of links 35, the other end of which is apertured to receive a pin 36 which pivotally connects the links 35 with a twisted link 37. Both links 37 are pivotally connected, by means of bolts 38, to opposed arms 39 of a T-shaped lever which is pivotally mounted on the frame bar 12 by means of a bolt 40. The other arm 41 of the lever is pivotally joined with the tie bar 26 by means of a pivot bolt 42. Figure 3 illustrates the positions of the parts when the wheels are parallel with the longitudinal axis of the cultivator and the latter is moving in a direction in alinement with its axis, it being of course necessary for the operator to maintain an equal pressure on the pedals with his feet to maintain the wheels in this relative position with respect to the axis. If, however, it is desired that the cultivator be moved to the right or left, so as to maintain the wheels midway between the rows of plants, the operator may increase the pressure on either the left or right hand pedal, depending upon which direction it is desired to steer the cultivator, whereupon the parts assume respectively the position, or the opposite thereof, as shown in Figure 5. It will be seen that depressing the left hand pedal in this case has swung the T-shaped lever about its pivot and moved the tie bar 26 and rods 24 to the left thereby swinging the wheels 20 so that the cultivator will track to the left.

Means are provided for supporting gangs of cultivator plows on the main frame and means are provided operable in conjunction with the steering mechanism just described for shifting the plow gangs as the cultivator is steered so as to insure correct tracking of the gangs in the furrows between the rows of plants. Positioned on the frame adjacent the forward frame bar 12 is a pair of rods 43 each being slidable axially with respect to the other, and to the frame, in bearings 44. Secured at spaced intervals to each of the rods, by U-shaped bolts 45, are bearing blocks 46 provided with bores, parallel to the axes of the rods, which provide sockets for receiving the angularly bent ends of tubular arms 47. These arms depend from the blocks 46 and at their lower ends are angularly bent to provide a horizontal portion upon which are pivotally mounted a block 48 and hubs 49. The blocks 48 are each provided with ears 50 apertured to receive the bent ends of stay rods 51 and 52 and the opposite ends of the stay rods are pivotally secured in apertures provided in the depending legs of the frame bars 12. The purpose of the stay bars is to stabilize the arms 47 and prevent movement thereof relatively to the frame in fore and aft directions.

Figure 1:
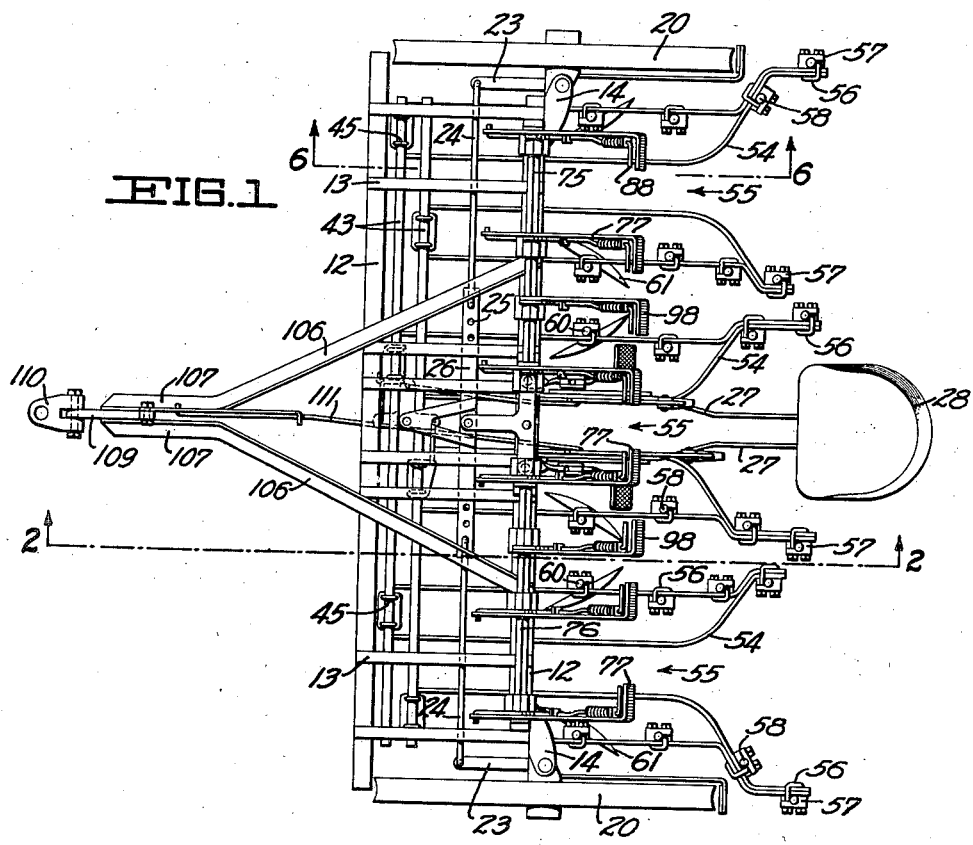
Figure 1 is a top plan view of the cultivator of this invention.

Each of the hubs 49 is provided with lugs 53 to which are secured plow bars 54. These plow bars are arranged in pairs, as is shown in Figure 1, each pair being attached to the hubs 49 carried by the lower ends of the arms 47, and are bent at their outer ends and joined together by welding or in any other manner. The arrangement of the bars is such that between certain pairs thereof unobstructed channels 55 are provided. On the various plow bars are mounted, by U-bolts 56, clamp blocks 57 which secure to the bars the stems 58 of cultivator plows or teeth 59. One set of blocks carries the stems 60 of dished disks 61. The plows are arranged, as will be seen in Figure 1, in six separate groups and each group is provided with a disk 61. In operation, the cultivator is drawn along over the rows of plants, the latter passing through the channels 55, the four inner groups of plows passing along the furrows on either side of the middle row of plants, and the outer sets of plows together with the wheels passing along the furrows on the outer side of the outside rows of plants. The plows are adapted to bite into the soil a considerable distance while the disks 61 in advance of each set of plows are for the purpose of breaking up the encrusted top soil and directing it away from the plants toward the center of the furrow where it will be pulverized by the plows. If it were not for the disks the plows would be liable to tear up large chunks of the top soil and cast them on top of the plants, possibly seriously injuring the latter.

One of the bearing blocks 46, adjacent the center of each of the rods 43, is provided with an extension 62 which is apertured to provide a pivot for one end of a link 63 the other end of which is pivotally secured in one of the opposed arms 64 of a T-shaped lever; the other arm 65 thereof extending outwardly at right angles to the arms 64 and downwardly to terminate at a point below the rods 43. The T-shaped lever is provided with a pivot bolt 66 which is secured at one end of a member, the arms 67 of which straddle the end of the steering lever arm 41 and are secured to the tie bar 26 by means of rivets 68. The outer end of the lever arm 65 is apertured to receive the end of a control rod 69 which passes rearwardly under the main frame and is pivotally attached to the depending portion of a control lever 71 the latter being pivotally mounted on one of the beams 27 and being provided with a notched quadrant 72 and with a spring pressed pin controllable by a thumb lever 73 which raises the pin out of the quadrant notches and permits movement of the lever. When the pin is seated in one of the notches it will be apparent that the lever is locked against movement.

Referring now to Figure 5 it will be seen that when one of the pedals 33 is depressed to steer the cultivator, the rods 43 will, due to their being connected with the tie bar 26 by means of the arms 67, shift axially in the same direction in which the cultivator is steered thereby shifting all of the plow gangs laterally of the cultivator. By moving the control lever 71 forward or backward the T-shaped lever 64—65 will be rotated about the axis of the pivot bolt 66 and will, due to the connection between the arms 64 and the bearing blocks 46, provided by the links 63, cause each rod 43 to shift axially with respect to the other and in opposite directions. Since, as is clearly illustrated in Figure 1, alternate pairs of plow bars 54 are carried by the rods the opposed shifting of the rods will cause the alternate groups of plows to move toward or away from the adjoining group with the result that the channels 55 through which the rows of plants pass may be either widened or narrowed and likewise the width of the course of soil churned up by the plows in each furrow may be increased or decreased.

Means are provided, controllable from the operator's seat, for regulating the depth which the plows enter the soil. Positioned just above the rear frame bar 12, and journaled at each end in brackets 74, is a pair of square shafts 75 and 76 and carried by these shafts directly above each connected pair of plow bars 54 is a lever 77. Each of the levers 77 is provided with an upper portion 78 and a lower extension 79 and is pivotally mounted, by means of a bolt 80 on an arm 81 carried by a clamp 82 secured by bolts 83 rigidly to the shafts. The outer portion of the arm 81 is curved to provide a quadrant 84 having notches 85 in the edge thereof which receive the end of a locking rod 86 slidably mounted in lugs 87 secured to the upper portion 78 of the lever. The upper end of the locking rod is bent outwardly to provide a handle 88, and a coil spring 89 is mounted about the rod and confined between the upper lug 87 and a washer 90 secured to the rod, for urging the end of the rod into engagement with one of the notches 85. The outer end of the lower extension 79 is apertured to pivotally receive the end of a pull rod 91 the lower end of which is slidably mounted, as is shown in Figure 6, in a transverse aperture formed in a shaft 92 pivotally carried by opposed plow bars 54. Nuts 93 are provided by means of which the distance between the pivot points at either end of the pull rods 91 may be varied. A coil spring 94 is mounted about the pull rod and is confined between the shaft 92 and a collar 95 mounted on the pull rod; the position of the collar being adjustable by means of a set screw 96 so that the degree of compression of the spring 94 may be varied. A spring 97 extends from the upper end of the spring 94 and is secured at its upper end to the rear frame bar 12. It will be seen that by swinging the lever 78 about its pivot, the plow bars 54 connected therewith will be swung about the axis of the hubs 49 thus raising or lowering the plows 59. The degree of penetration of the plows into the soil may be varied by allowing the locking rod 86 to remain in any one of the notches 85. It will be observed that there is a slip connection between the lower end of the pull rod 91 and the plow bars 54. This is provided so that if a gang of plows encounters a rock in the soil they may ride over it, the bars being capable of moving upwardly independently of the pull rod against the tension of the spring 94. The spring 97 is provided to assist in raising the plow gangs from the soil when the lever locking rod is released.

It will be seen that each lever 77 provides means for raising or lowering each individual gang of plows. Means are also provided whereby all groups of plows lying at either side of the longitudinal axis of the cultivator may be simultaneously raised. This is accomplished by providing a so-called master lever 98 on each of the shafts 75 and 76. These levers are secured to the shafts by clamps 99 held by bolts 100, and are provided with locking rods 101 urged by springs 102 into the notches 103 of quadrants 104 secured by rivets 105 to the cross members 13 of the main frame. It will be seen that since the quadrants 104 are fixed, the shafts 75 and 76 will be held against rotation and while so fixed also prevent movement of the quadrants 84 associated with the levers 77. When one of the master levers is moved it will rotate its shaft and consequently all of the levers 77 connected with that shaft will move simultaneously to raise or lower the sets of plow gangs. It is thus possible to cultivate with but one group of plows, the other group being held up out of engagement with the soil.

Means are provided whereby the penetration of all of the gangs of plows may be instantly and equally varied. Secured to the upper surface of each frame bar 12 is a pair of convergent bars 106, these bars being brought downwardly as they leave the main frame into parallel relation and between these parallel portions 107 is pivotally secured, by means of a pin 108 a bell crank 109 one arm of which extends horizontally and is provided with a coupling 110 apertured to receive the hook of the draw bar of a tractor or other source of motive power, and the other arm of which extends vertically and is connected by means of a control rod 111 with a control lever 112 pivotally on one of the bars 27 which support the seat 28. This lever is provided with a spring pressed locking rod 113 which engages in the notches 114 of a quadrant 115 similarly to the mounting of the control lever 71. By moving the lever 112 forward and backward the bell crank will be swung about its pivot thus raising or lowering the pivot with respect to the coupling 110 and consequently raising or lowering the plows, since the entire cultivator rocks about the axis of rotation of the wheels 20.

The cultivator just described is extremely flexible in operation, since the plows are capable of movement as a unit transversely of the device, thereby making the cultivator sensitively responsive to the steering controls and enabling the operator to quickly restore the plows to correct alinement with the furrows should the cultivator drift to either side thereof. This arrangement also permits the operator to follow abrupt curvatures of the furrows. The provision of means for regulating the width of the courses of soil churned up by the plows is another valuable feature as are also the provision of the disk associated with each plow gang for breaking up and directing the encrusted top soil toward the center of the furrow, thereby preventing possible damage to the plants, and the feature of the adjustability of the vertical settings of the plows either individually in selected groups, or as a unitary assembly.

We claim:

1. A cultivator comprising a frame, spindles pivotally mounted on said frame, wheels rotatably mounted on said spindles, arms secured to and extending from said spindles, a tie rod connecting said arms for movement together, a pair of shafts mounted on said frame for relative axial movement, a plurality of bars pivotally connected with each of said shafts, alternate bars being carried by the respective shafts, cultivator plows carried by said bars, a pair of foot operated levers mounted on said frame, means for connecting said levers with said tie bar whereby said tie bar is moved axially when said foot operated levers are depressed to move said wheels relatively to said frame to steer the cultivator in lateral directions, means for connecting said tie bar and said shafts together whereby said shafts are moved axially with said tie bar when the latter is moved, and means for moving said shafts axially of each other in opposite directions independently of said tie bar to move said plow bars toward and away from each other, said means comprising a lever pivotally carried by said tie bar, links pivotally connecting opposite ends of said lever with the respective shafts, an arm extending from said lever, an operating lever pivotally mounted on said frame, and a rod connecting said lever arm and said operating lever for movement together.

2. A cultivator comprising a frame, spindles pivotally mounted on said frame, wheels rotatably mounted on said spindles, arms secured to and extending from said spindles, a tie rod connecting said arms for movement together, a pair of shafts mounted on said frame for relative axial movement, a plurality of bars pivotally connected with each of said shafts, alternate bars being carried by the respective shafts, cultivator plows carried by said bars, a pair of foot operated levers mounted on said frame, a rocking lever pivotally mounted on said frame and connecting said foot operated levers for opposed movement together, an arm carried by said rocking lever and pivotally attached to said tie rod, an arm fixed to and extending from said tie rod, a rocking lever carried by said tie rod arm, an arm extending from said second rocking lever, an operating lever pivotally mounted on said frame and securable thereto in different positions of movement, and a rod connecting said operating lever and the arm of said second rocking lever for movement together.

3. A cultivator comprising a frame, spindles pivotally mounted on said frame, wheels rotatably mounted on said spindles, arms secured to and extending from said spindles, a tie rod connecting said arms for movement together, a pair of non-rotatable shafts slidably mounted on said frame for relative axial movement, a plurality of bars pivotally connected with each of said shafts, alternate of said bars being carried by the respective shafts, cultivator plows carried by said bars, a pair of foot operated levers pivotally mounted on said frame, a rocking lever pivotally mounted on said frame and connecting said foot operated levers for opposed movement together, an arm carried by said rocking lever and pivotally attached to said tie rod, an arm fixed to and extending from said tie rod, a rocking lever carried by said tie rod arm, an arm extending from said second rocking lever, an operating lever pivotally mounted on said frame and securable thereto in different positions of movement, a rod connecting said operating lever and the arm of said second rocking lever for movement together, a pair of independently rotatable shafts mounted on said frame, extensions fixed at spaced intervals to and movable with said shafts, a manually operated lever pivotally mounted on each of said extensions, means for securing said manually operated levers to said shafts for preventing relative movement therebetween, a manually operated master lever fixed to each of said shafts, means for connecting each of said first manually operated levers to respective bars, and means for securing each of said master levers to said frame for preventing movement of said levers and said shafts.

4. A cultivator comprising a frame, spindles pivotally mounted on said frame, wheels rotatably mounted on said spindles, arms secured to and extending from said spindles, a tie rod connecting said arms for movement together, a pair of non-rotatable shafts slidably mounted on said frame for relative axial movement, a plurality of bars pivotally connected with each of said shafts, alternate of said bars being carried by the respective shafts, cultivator plows carried by said bars, a pair of foot operated levers pivotally mounted on said frame, a rocking lever pivotally mounted on said frame and connecting said foot operated levers for opposed movement together, an arm carried by said rocking lever and pivotally attached to said tie rod, an arm fixed to and extending from said tie rod, a rocking lever carried by said tie rod arm, an arm extending from said second rocking lever, an operating lever pivotally mounted on said frame and securable thereto in different positions of movement, a rod connecting said operating lever and the arm of said second rocking lever for movement together, a pair of independently rotatable shafts mounted on said frame, extensions fixed at spaced intervals to and movable with said shafts, a manually operated lever pivotally mounted on each of said extensions, means for securing said manually operated levers to said shafts for preventing relative movement therebetween, a manually operated master lever fixed to each of said shafts, means for connecting each of said first manually operated levers to respective bars, means for securing each of said master levers to said frame for preventing movement of said levers and said shafts, a pair of bars secured at one end thereof to said frame and extending outwardly beyond said frame in closely adjacent parallel relationship, a bell crank pivotally mounted on the parallel portions of said bars, a coupling secured to one arm of said bell crank by means of which said cultivator may be connected to the draw bar of a tractor, an adjusting lever pivotally mounted on said frame, a rod connecting said adjusting lever with the other arm of said bell crank, and means for securing said adjusting lever to said frame in different positions of movement thereof for raising or lowering said coupling with respect to the frame of the cultivator so as to pivot the cultivator about the rotational axis of said wheels and simultaneously raise or lower all of said cultivator plows.

GEORGE SOUZA.
EDWARD SOUZA.